INVENTORS.
ERNEST W. COOKNEY
PAUL I. PETERSEN
BY Theodore M. Jablon
ATTORNEY.

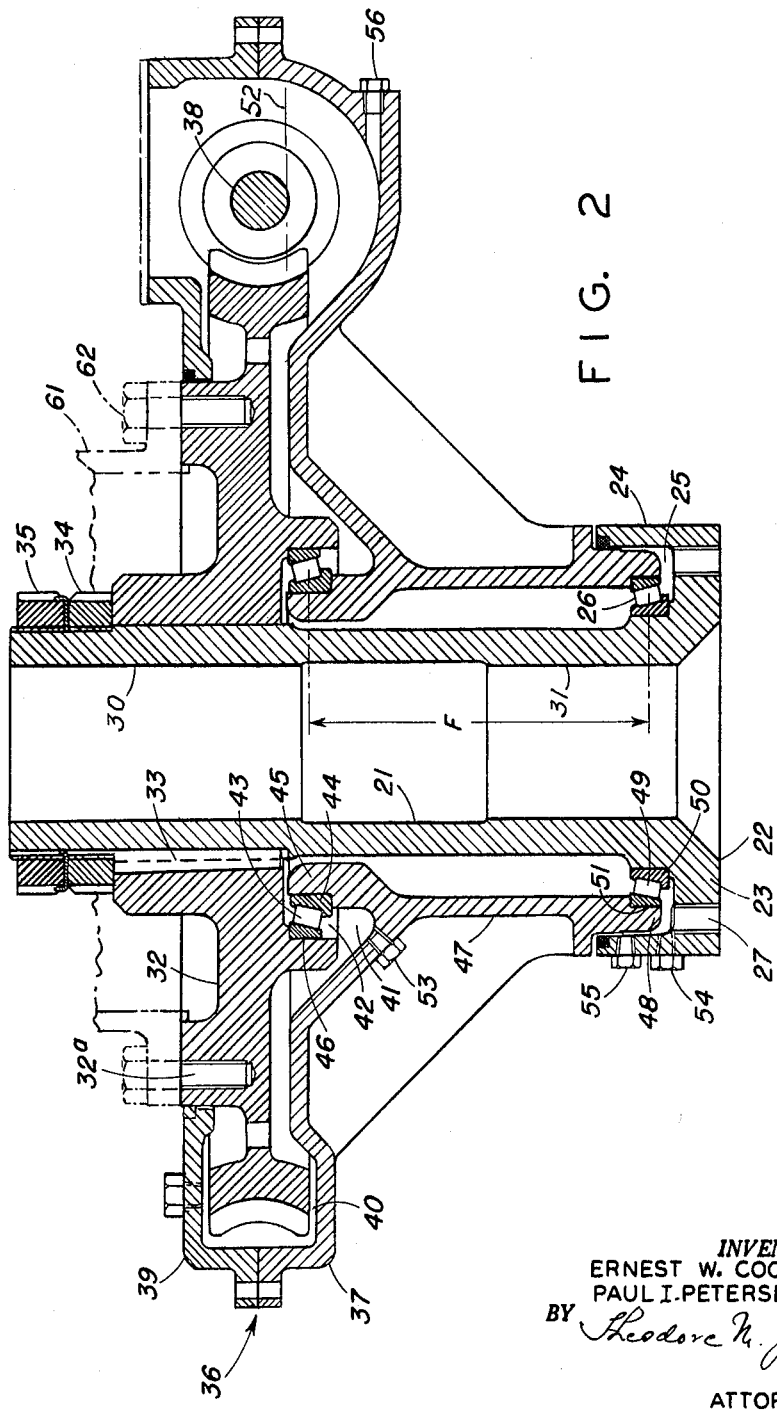

March 15, 1966 E. W. COOKNEY ETAL 3,240,349
SEDIMENTATION TANK HAVING ROTATABLE
SEDIMENT CONVEYING STRUCTURE
Filed June 25, 1962 3 Sheets-Sheet 3
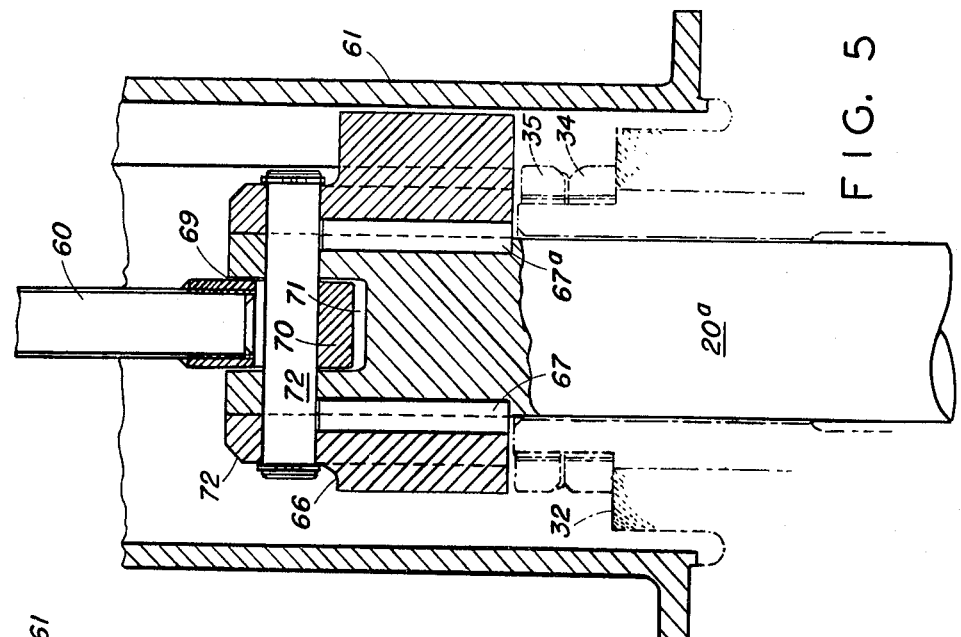
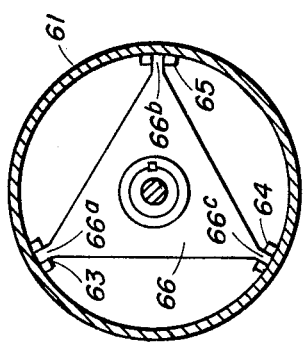
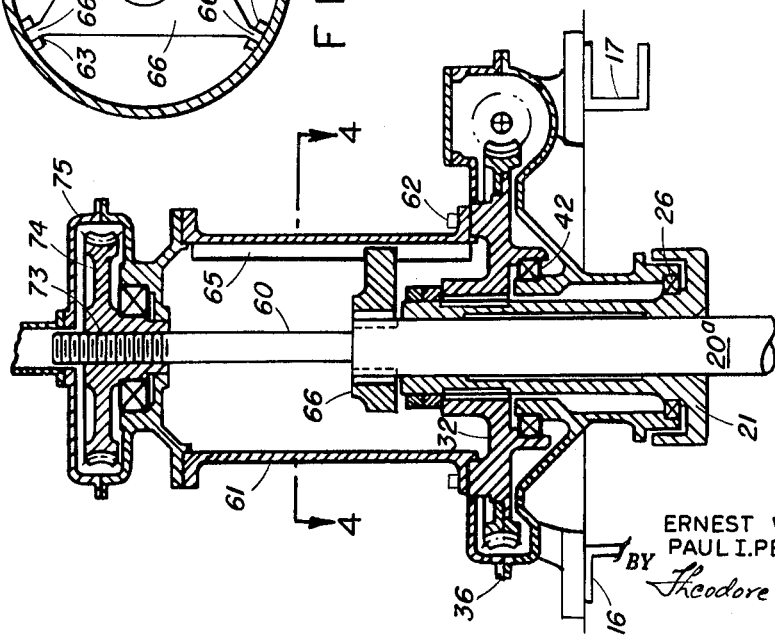
INVENTORS.
ERNEST W. COOKNEY
PAUL I. PETERSEN
BY Theodore M. Jablon
ATTORNEY.

United States Patent Office 3,240,349
Patented Mar. 15, 1966

3,240,349
SEDIMENTATION TANK HAVING ROTATABLE
SEDIMENT CONVEYING STRUCTURE
Ernest W. Cookney and Paul I. Petersen, Stamford Conn.,
assignors to Dorr-Oliver Incorporated, Stamford,
Conn., a corporation of Delaware
Filed June 25, 1962, Ser. No. 204,809
17 Claims. (Cl. 210—531)

This invention relates to continuously fed sedimentation tanks wherein a rotary driven sediment engaging structure moves the sediment or sludge continuously over the tank bottom to an outlet means while supernatant liquid overflows continuously from the tank.

More particularly, the invention is concerned with improvements in a type of settling tank wherein the rotary rake structure comprises a vertical shaft supported from a main drive gear coaxial therewith, which gear in turn is operatively supported for rotation upon a bridge structure spanning the tank, so that the bladed rake arms extending from the lower end of the shaft will move the sediment to the outlet means by the rotation of said gear together with said shaft.

In machines of this kind, which may have a lifting mechanism for the rake structure associated with the drive arrangement, it is a problem to provide compact means for adequately stabilizing the shaft against uneven or unbalancing rake load conditions while operatively supporting the weight of the rake structure for rotation.

A needed counter-balancing moment against such uneven load effects is provided for example in the drive mechanism disclosed in U.S. Patent to Scott No. 3,002,400, by the well-known large annular vertical thrust ball bearing supporting the peripheral portion of the gear, wtih the gear housing in turn providing anti-tilting means effective marginally at the top of the gear. However, it is the aim of this invention to meet stability requirements and to provide effective anti-tilting means for the rake structure, while avoiding the use of the large annular thrust bearing directly associated with the gear. Hence, the aim is to provide a simple compact arrangement of much smaller low cost yet rugged and highly effective anti-tilting bearing means for the shaft, highly resistant to wear and tear, easy to assemble and to adjust with respect to bearing tolerance or pre-load pressure in the bearings, and with lubrication maintenance as well as power consumption minimized. Hence, the invention will provide a drive arrangement wherein the shaft is effectively stabilized by a pair of vertically spaced bearings combined with simple means for adjusting the working tolerance or pre-load pressure in the bearings and with improved simple lubricating means whereby these bearings may operate in pools of oil readily maintainable without the need of the conventional oil seal rings.

Another object is to provide a drive unit pre-assembled and adjusted as a package having the aforementioned qualifications, which unit should be readily applicable for connection with the rake structure irrespective of whether or not a lifting mechanism be required.

The foregoing objects are attainable by the provision of a drive unit built around a vertical stub shaft member fixed to the drive gear in torque transmitting relationship therewith. Two vertically spaced bearings arranged below the gear, preferably in the form of cooperating conical roller bearings, absorb the tilting forces from the rake structure through the stub shaft member, the bearings together being capable of resisting radial forces as well as axial thrust in both directions. The upper bearing is located in an annular trough formed by the upper casing portion, while the lower bearing is located in an external trough formed by the stub shaft member. Each of these bearings may thus operate in its own pool of oil contained in the respective troughs thus formed.

According to one feature, with the two conical roller bearings, the working tolerance or pre-load pressure in the bearings is closely adjustable by the adjustment axially of the stub shaft member relative to the gear, for achieving optimum stabilization while minimizing wear and tear as well as power consumption required for the operation of the raking structure in the tank.

Other features and advantages will hereinafter appear.

As this invention may be embodied in several forms without departing from the spirit or essential characteristis thereof, the present embodiment is therefor illustrative and not restrictive since the scope of the invention is defined by the appended claims rather than by the description preceding them, and all changes that fall within the metes and bounds of the claims, or of forms that are their functional as well as conjointly cooperative equivalents, are therefore intended to be embraced by those claims.

FIG. 2 is a greatly enlarged vertical sectional view of the improved drive unit of the invention, showing the details of the novel bearing arrangement of the shaft stabilizing feature;

FIG. 3 illustrates the drive unit under conditions requiring a lifting mechanism for the rake structure, including the torque transmitting means effective between a torque tube and the shaft;

FIG. 4 is a cross-sectional view of the rake lifting mechanism taken on line 4—4 of FIG. 3, to further illustrate an example of the torque transmitting means;

FIG. 5 is a greatly enlarged view taken from FIG. 3, showing details of the torque transmitting means embodied in the rake lifting mechanism.

Figure 1:
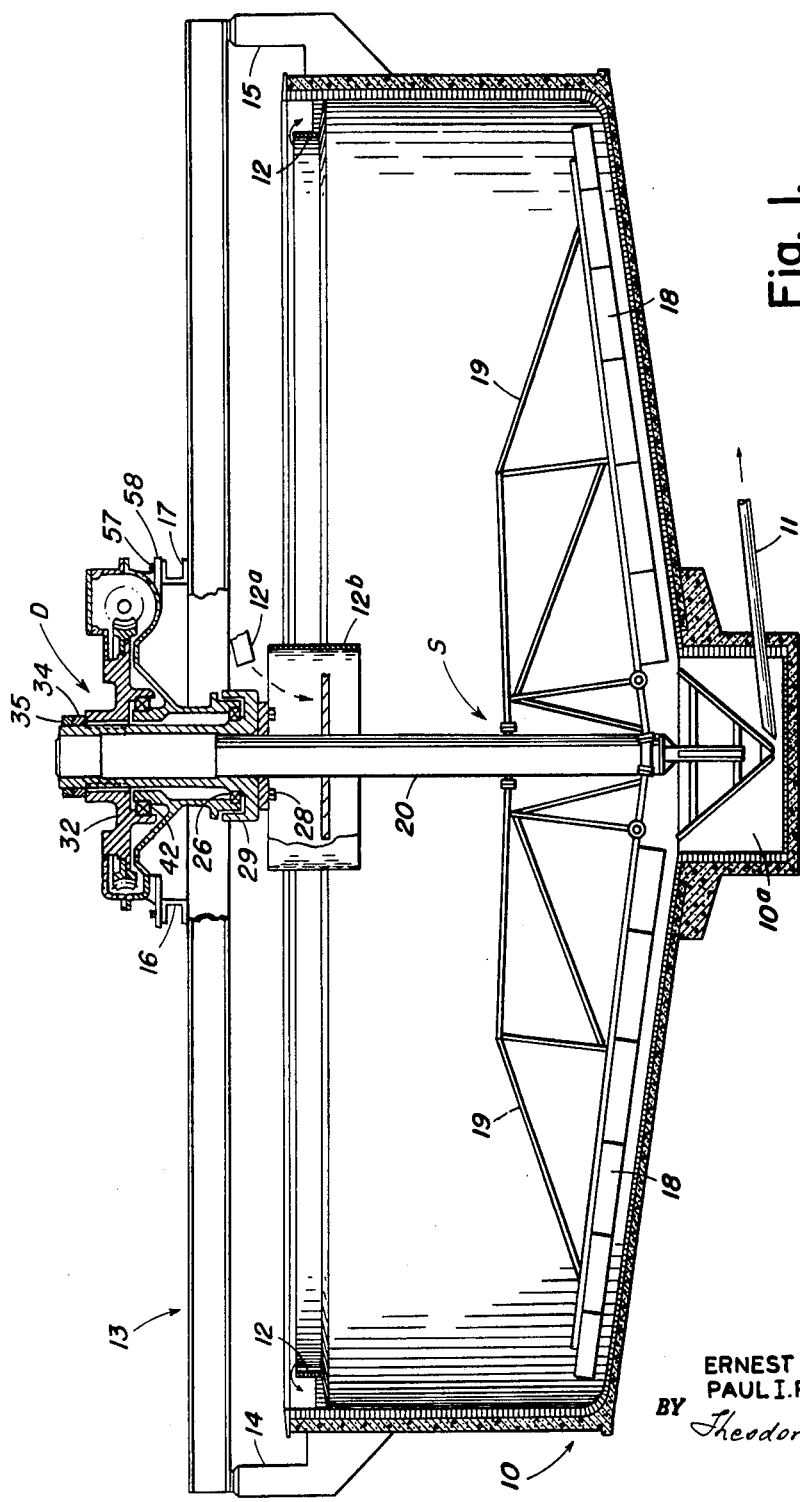
FIG. 1 is a vertical sectional view of a sedimentation tank with sediment conveying mechanism embodying the shaft stabilizing feature in the drive unit of this invention, illustrating the condition requiring no rake lifting mechanism.

As illustrated in FIG. 1, the invention is embodied in a sedimentation apparatus which comprises for example a round settling tank 10 which has a shallow conical bottom provided with a central sump 10a receiving sediment or sludge conveyed thereto from the bottom, and with a sludge withdrawal conduit or pipe 11 leading from the sump. This tank has a cylindrical wall provided at the top end with an overflow launder receiving clarified liquid and having a discharge means therefor not shown. Feed suspension is delivered continuously into a cylindrical feedwell 12b located centrally of the tank and surrounding the vertical shaft 20 of a rake structure S which has sediment engaging raking blades 18 carried by rake arms 19 which extend from the lower end portion of the shaft, effective when the structure S is rotated about its vertical axis to convey the sediment or sludge over the tank bottom into the sump for withdrawal through pipe 11, while clarified liquid overflows into the launder 12. A bridge construction 13 preferably in the form of a pair of parallel horizontal beams extends diametrically across the top of the tank, the beams being supported at their respective ends by respective columns 14 and 15 or the like.

Furthermore, in the embodiment of FIG. 1, the rake structure S is rotatably supported from a drive unit D which in turn is shown mounted upon and supported by a pair of parallel horizontal cross members 16 and 17 mounted upon the aforementioned parallel beams of the bridge construction.

The drive unit "D" embodies important novel features providing effective yet very simple and compact stabilizing or antitilting means for the rake structure. The antitilting arrangement in this drive unit comprises upper and lower bearing means spaced vertically from each other, and it also provides certain accurate bearing adjustment devices as a further means of stabilization and improving wear and tear. Combined with this arrangement are highly practical novel yet simple lubricating means insuring constant oil lubrication of the upper, as well as of the lower bearing means.

The drive unit furthermore is in the nature of a preassembled and pre-adjusted basic package readily mountable as such upon the bridge construction, and capable of being connected to the rake structure either directly as illustrated in the embodiment of FIG. 1, or in conjunction with a mechanism for axially raising and lowering the rake structure where such an operation is required to meet sediment load conditions in the tank, as illustrated in FIGS. 3 to 5.

The basic drive unit or package "D" of this invention, according to the enlarged detail showing thereof in FIG. 2, comprises as a central part a vertical hollow stub shaft member 21 having a specially shaped lower end portion 22, comprising a bottom flange 23 which in turn is formed peripherally with an upstanding crown portion or cylindrical wall 24, thus providing a lower annular trough or cup 25 for containing a bath or pool of oil insuring continuous lubrication of a lower combination bearing means 26 located in that trough. The bottom flange portion has threaded holes 27 providing for bolt connection 28 (see FIG. 1) with a companion flange 29 fixed on shaft 20 of the raking structure. Internally the stub shaft member has cylindrical faces 30 and 31 spaced vertically from each other for accommodating the shaft of the rake structure when vertical sliding movement thereof relative to the drive unit is desired as with the use of the lifting mechanism illustrated in FIGS. 3 to 5.

A worm gear 32 is connected to the upper end portion of stub shaft member 21 as indicated by the key connection 33, with locknuts 34 and 35 provided at the top of the stub shaft member for securing the respective parts in axially adjusted position relative to one another.

The worm gear 32 is mounted in a specially constructed gear casing 36 which has an upper shallow portion 37 substantially in the nature of an annular tray surrounding the gear as well as accommodating a worm shaft 38 driving the gear. An annular cover member 39 constitutes the top portion of the gear casing. The bottom of the upper or shallow casing portion is formed with an outer annular trough 40 containing a pool of oil lubricating the worm gear 32 and the associated worm shaft 38, and furthermore formed with an inner annular trough 41 containing a pool of oil for lubricating an upper combination bearing means 41 located in that trough.

The upper combination bearing means such as herein exemplified comprises a set of conical antifriction rollers 43 having upwardly convergent axes, an inner stationary raceway member 44 for these rollers seated upon the inner wall 45 of the annular trough, and an outer raceway member 46 rotating with the gear and fitted into the underside thereof.

The gear casing further comprises a downward relatively constricted lower end portion or extension 47 surrounding the respective downwardly extending portion of the stub shaft member 21. The extreme lower terminal portion 48 of extension 47 lodges in the lower annular trough 25 provided by the stub shaft member, where it has stabilizing engagement with the lower end of the stub shaft member through the aforementioned lower combination bearing means 26. This lower bearing means as herein exemplified comprises a set of conical antifriction rollers 49 having upwardly converging axes, an inner raceway member 50 for the rollers, and an outer raceway member 51 seated within the lower terminal portion 48 of the casing.

The oil level maintainable in the upper portion of the casing is indicated at 52. An oil drain hole for the upper oil trough 41 has a closure screw 53, while an oil drain hole provided in the lower oil trough 25 has a closure screw 54. A suitable oil level indicator may be mounted in the outer cylindrical wall of the lower oil trough 25, but is here only represented by an inspection-or overflow hole closed by screw 55.

The worm gear 32 has a set of threaded holes 32a at the top, allowing for bolt connection to this gear of mechanism for raising and lowering the rake structure, as described below.

An oil drain hole for the oil bath serving the worm shaft 38 is closed by a screw 56, and an oil level indicator for this pool may be provided but is here not particularly shown.

With respect to the stabilizing effect of the bearing arrangement of this invention, it will be noted that the effective distance "F" between the upper and the lower combination bearing means provides the anti-tilting moment for the rake structure. More particularly, according to the invention, the stub shaft member 21 is axially adjustable relative to the gear by manipulating the locknuts at the top for effecting accurate adjustment of the opertaing tolerances or pre-load pressures required in the respective upper and lower conical roller bearings relative to one another. Such bearing adjustment may be effected during the factory assembly of the drive unit "D" shown in FIG. 2, with the locknuts secured so that the drive unit as a package may be mounted upon the aforementioned cross member 16 and 17 of the bridge construction. The shaft of the rake structure may then be connected to the stub shaft member, either directly as by the flange connection illustrated in FIG. 1, or else through the rake lifting mechanism carried by the worm gear 32 and further to be described.

According to a feature, effective lubrication of all the bearings as well as of the drive elements in the gear casing, is insured in this drive unit, in that oil may be supplied into the upper casing portion so as to overflow the inner wall 45 of the upper bearing trough 41, thereby also supplying the lower bearing trough 25 with a pool of oil the overflow level of which in turn can be observed indicating that the upper bearing trough is full of oil and the upper bearing itself substantially submerged therein.

According to the invention, the embodiment of FIG. 1 can be readily converted into the one illustrated in FIGS. 3 to 5 to meet the rake lifting requirement. To that end, it is only necessary to have the shaft 20a of the rake structure (see FIG. 3) axially slidable in stub shaft member 21 of the drive unit, and to have the top end of shaft 20a extending upwardly beyond the stub shaft member, and to provide means for vertically guiding the shaft while secured against rotation relative to the stub shaft member and relative to the gear. The shaft or rake structure then is axially suspended by a rake lifting device including a vertical screw spindle 60 operatively supported by a gear. The rake lifting mechanism thus carried by the gear may be of any suitable construction, but in the preferred embodiment herein illustrated is in the nature of one disclosed in the aforementioned patent to Scott No. 3,002,400. When so converting the embodiment of FIG. 1 for rake lifting operation, it will be understood that the threaded holes provided in the bottom flange of the stub shaft member may be closed in any suitable manner.

Accordingly, the rake lifting arrangement in FIGS. 3 to 5 as applied to the drive unit of FIG. 2 comprises a vertical torque tube member 61 mounted upon worm gear 32 concentrically therewith, as indicated by fastening bolts 62 screwed into the aforementioned threaded holes 32a in the gear. The torque tube member is provided with three vertical guide track means or vertical grooves 63, 64 and 65 substantially equally spaced from one another about the vertical axis of the shaft. Cooperating with the vertical tracks of the torque tube member is a torque receiving member 66 fixed at the top end of shaft 20a as indicated by key connections 67 and 67a, which torque receiving member is formed with three projections or torque portions 66a, 66b, and 66c engaging respective vertical grooves of the torque tube member.

The shaft 20a in turn is axially suspended by the vertical screw spindle 60 preferably by means of a universal joint connection 69 an example of which is illustrated in the enlarged detail of FIG. 5. According to that embodiment the connection comprises an eye portion 70 fixed to the lower end of the screw spindle and lodging in a top end recess 71 of the shaft, the eye member being loosely fitted over a pin 72 which in turn extends transversely through the top end of the shaft as well as through an associated hub portion 72 of the torque receiving member 66.

The screw spindle 60 operates in an actuating nut 73 which in effect constitutes the hub of a worm gear 74 rotatably mounted in a housing 75 which in turn is fastened to the top end of the torque tube member 61. The worm gear 74 is part of a worm gear drive in a rake lifting mechanism such as exempled in the U.S. patent to to Scott No. 2,360,817. Therefore, when the gear is rotated in the one or in the other direction, it will correspondingly either lower or raise the screw spindle 60 and the sediment raking means connected thereto.

When the worm gear 32 is rotated, the torque tube member rotating therewith will transmit a driving torque from the vertical tracks or grooves equally distributed to the three torque portions of the torque receiving member and thus to the shaft 20a or sediment raking structure operating in the tank. The three torque portions are loosely slidable vertically in the respective associated grooves, so that a balanced drive torque will be transmitted to the raking structure in any of the positions to which it may be raised or lowered by the operation of the lifting mechanism.

From the foregoing, it may be seen that the invention provides a highly compact drive unit for supporting and rotating a vertical shaft or sediment raking structure, featuring a novel arrangement of upper and lower shaft-stabilizing bearing means of relatively small diameter and which may be of standard size, yet highly effective in their shaft-stabilizing function as well as highly wear resistant as a whole in the present combination. Furthermore, in conjunction with this improved bearing arrangement the invention provides novel and highly practical and effective yet very simple oil lubricating means for the respective upper and lower stabilizing bearings, avoiding grease type lubrication and the maintenance thereof. Furthermore, the invention provides a one-point oil supply arrangement whereby the respective oil pools for the bearings can be readily maintained and checked.

We claim:
1. A drive mechanism which comprises, a vertical shaft member, a gear mounted on said shaft member in torque transmitting relationship therewith and axially movable thereon, an external annular oil trough provided on said shaft member concentrically therewith and spaced downwardly from said gear, a housing structure having an upper portion surrounding said gear and having a lower end portion surrounding a portion of said shaft member which extends downwardly from said gear, an upper combined radial and axial thrust bearing surrounding said shaft member and located adjacent to said gear at the lower side thereof and effective between said gear and said upper portion of said housing structure, said upper bearing being arranged for transmitting axial thrust from said gear downwardly to said upper portion of the housing structure, a lower combined radial and axial thrust bearing located in said external oil trough of the shaft member and effective between said trough and said lower end portion of said housing structure, and arranged for transmitting axial thrust from said shaft member upwardly to the lower end portion of the housing structure, adjustable means located at the upper side of said gear in engagement with said shaft member and with said gear, for axially positioning and securing said shaft member relative to said gear and thereby to adjust the operating tolerances in said upper and lower bearings, and drive means for rotating said gear and said shaft member.

2. A drive mechanism which comprises, a vertical shaft member, a gear mounted on said shaft member in torque transmitting relationship therewith and axially movable thereon, a housing structure having a upper portion surrounding said gear and having a lower end portion surrounding a portion of said shaft member which extends downwardly from said gear, the upper portion of said housing structure being formed with an annular oil trough surrounding said shaft member at the underside of said gear, an upper combined radial and axial thrust bearing surrounding said shaft member and located in said annular oil trough of the housing structure and effective between said trough and said gear, and arranged for transmitting axial thrust from said gear downwardly to the upper portion of the housing structure; a lower combined radial and axial thrust bearing surrounding said shaft member and effective between said shaft member and said lower end portion of the housing structure, and arranged for transmitting axial thrust from said shaft member upwardly to the lower end portion of the housing structure, adjustable means located at the upper side of said gear in engagement with said shaft member and with said gear, for axially positioning and securing said shaft member relative to said gear and thereby to adjust the operating tolerances in said upper and lower bearings, and drive means for rotating said gear and said shaft member.

3. A drive mechanism which comprises, a vertical shaft member, a gear mounted on said shaft member in torque transmitting relationship therewith and axially movable thereon, a lower external annular oil trough provided on said shaft member concentrically therewith and spaced downwardly from said gear, a housing structure having an upper portion surrounding said gear and having a lower end portion surrounding a portion of said shaft member which extends downwardly from said gear, said housing structure being formed with an upper annular oil trough surrounding said shaft member and located adjacent to said gear, an upper combined radial and axial thrust bearing surrounding said shaft member and located in said upper annular oil trough and comprising an inner race and an outer race with antifriction bearing elements effective between said inner and outer races, one of said races being mounted on said gear, the other of said races being mounted on an adjacent upper portion of said housing structure, said upper bearing being adapted for transmitting axial thrust from said gear downwardly to said adjacent upper housing portion, a lower combined radial and axial thrust bearing located in said lower oil trough of the shaft member and spaced downwardly from said upper trough, and comprising an inner race and an outer race with antifriction bearing elements effective between said inner and outer races, one of said races being mounted on said shaft member, the other of said races being mounted on said lower end portion of the housing structure, said lower bearing being adapted for transmitting axial thrust from said shaft member upwardly to said lower end portion of the housing structure, adjustable means located at the upper side of said gear in engagement with said shaft member and with said gear, for axially positioning and securing said shaft member relative to said gear and thereby to adjust the operating tolerances in said upper and lower bearings and drive means for rotating said gear and said shaft member.

4. The drive mechanism according to claim 3, wherein said upper bearing has the inner race mounted on said adjacent upper portion of the housing structure, and the outer race mounted on said gear, and wherein said lower bearing has the inner race mounted on said shaft member and the outer race mounted on said lower end portion of the housing structure.

5. The drive mechanism according to claim 1, wherein said adjustable means comprise a threaded abutment member in threaded engagement with said shaft member and positionable thereon by screwing said abutment member up or down on said shaft member.

6. The drive mechanism according to claim 3, wherein said upper annular trough has overflow means at the inner periphery thereof adapted for oil from said upper trough to overflow into said lower annular trough, when oil is added to said upper trough.

7. The drive mechanism according to claim 6, wherein said lower trough has oil level indicator means therein adapted to show if both the upper and the lower annular troughs are full of oil when oil is added to said upper trough.

8. The drive mechanism according to claim 3, wherein said shaft member is a tubular element, wherein said adjustable means comprise a threaded member having thread engagement with said tubular eleemnt, wherein a slide shaft member is provided axially movable in said tubular element, with the addition of first actuating means for axially moving said slide shaft member while maintaining torque transmitting relationship therewith, said first actuating means comprising a torque tube member extending upwardly from the top face of said gear substantially concentric with the axis of rotation thereof and provided with a plurality of internal parallel vertical tracks, a torque receiving member connected to the upper end of said slide shaft member and having torque portions engaging respective vertical tracks, and second actuating means mounted on said torque tube member for axially moving said slide shaft member.

9. The drive mechanism according to claim 3, wherein said shaft member comprises a stub shaft portion having its lower end portion provided with said lower external annular oil trough.

10. The drive mechanism according to claim 3, wherein said shaft member is a tubular stub shaft member, wherein said adjustable means comprise adjustable abutment means surrounding and associated with said tubular stub shaft member, and wherein there are provided a slide shaft member axially movable in said tubular stub shaft member, as well as means for axially moving said slide shaft member while in torque transmitting engagement with said stub shaft member.

11. A drive mechanism which comprises a vertical shaft member, a gear coaxially connected to said shaft member in torque transmitting relationship therewith and axially movable thereon, a housing a structure having an upper portion surrounding said gear and having a lower end portion surrounding a portion of said shaft member which extends downwardly from said gear, an upper combined radial and axial thrust bearing surrounding said shaft member and located adjacent to the underside of said gear and effective between said gear and said upper portion of said housing structure, and arranged for transmitting axial thrust from said shaft member through said gear downwardly to said upper portion of said housing structure, lower combined radial and axial thrust bearing means surrounding said shaft member and effective between said shaft member and said lower end portion of the housing structure, and arranged for transmitting axial thrust from said shaft member upwardly to said lower end portion of the housing structure adjustable means located at the upper side of said gear in engagement with said shaft member and said gear, for axially positioning and securing said shaft member relative to said gear, and thereby adjusting the operating tolerances in said upper and lower bearings, and drive means for rotating said gear and said shaft member.

12. In a rotary sediment raking apparatus of the type wherein a rake structure is rotated about a vertical axis by a drive head supported on an overhead construction traversing a sedimentation tank, a drive head which comprises a vertical stub shaft member, a gear member mounted on said stub shaft member in torque transmitting relationship therewith although axially movable thereon, a housing structure mounted on said overhead construction, and having an upper portion surrounding said gear member and having a lower end portion surrounding a portion of said stub shaft member which extends downwardly from said gear, an upper combined radial and axial thrust bearing surrounding said shaft member and effective between said gear and a downwardly adjacent upper portion of said housing structure, and arranged for transmitting axial thrust from said gear member downwardly to said adjacent upper housing portion; a lower combined radial and axial thrust bearing surrounding said shaft member and effective between said stub shaft member and the lower end portion of said housing structure, and arranged for transmitting axial thrust from said stub shaft member upwardly to said lower end portion of the housing structure, adjustable means located at the upper side of said gear in engagement with said shaft member and said gear, for axially positioning and securing said shaft member relative to said gear and thereby to adjust the operating tolerances in said upper and lower bearings, a vertical rake shaft member, means for supporting said rake shaft member coaxially with said stub shaft member in torque transmitting relationship therewith and with said gear, and drive means for rotating said gear, said stub shaft member and said rake shaft member.

13. The apparatus according to claim 12, wherein said supporting means provides a fixed connection between said rake shaft member and said stub shaft member.

14. The apparatus according to claim 12, wherein said stub shaft member is a tubular element, wherein said adjustable means comprise at least one nut member surrounding said stub shaft member at the upper side of said gear member and thread-connected thereto, wherein said rake shaft member is axially movable in said tubular stub shaft member, with the addition of means for axially moving said rake shaft member and means for maintaining torque transmitting relationship between said tubular stub shaft member and said rake shaft member.

15. The apparatus according to claim 12, wherein the lower end portion of said stub shaft member is provided with an external annular oil trough, and said lower bearing is located in said trough.

16. The apparatus according to claim 12, wherein said housing structure is formed with an internal annular trough surrounding said stub shaft member adjacent the underside of said gear, and wherein the lower end portion of said stub shaft member is provided with an external annular trough, said upper bearing being located in said internal annular trough, said lower bearing being located in said external annular trough.

17. The drive head according to claim 11, wherein said adjustable means comprise a pair of nuts surrounding the top end portion of said shaft member, and adapted to lock each other in adjusted position.

(References on following page)

References Cited by the Examiner

UNITED STATES PATENTS

| | | | |
|---|---|---|---|
| 1,438,570 | 12/1922 | Zimmerman | 308—207.1 |
| 1,890,685 | 12/1932 | Johnson | 74—425 X |
| 2,292,690 | 8/1942 | Hoge | 74—425 |
| 2,360,817 | 10/1944 | Scott | 210—531 |
| 2,681,578 | 6/1954 | Shields | 74—606 X |
| 2,710,457 | 6/1955 | Cirrito et al. | 74—425 |
| 2,724,506 | 11/1955 | Hardinge | 210—528 |
| 2,910,882 | 11/1959 | Wellauer | 74—606 X |
| 2,935,885 | 5/1960 | Saari | 74—425 |
| 2,939,330 | 6/1960 | Margetts | 74—606 X |
| 3,002,400 | 10/1961 | Scott | 210—531 X |

FOREIGN PATENTS 635,573  4/1950  Great Britain.

REUBEN FRIEDMAN, *Primary Examiner.*

HERBERT L. MARTIN, *Examiner.*